US007734524B2

(12) United States Patent
Tyson

(10) Patent No.: US 7,734,524 B2
(45) Date of Patent: Jun. 8, 2010

(54) CUSTOMIZED FINANCIAL INSTRUMENT PROVIDING A STREAM OF PAYMENTS

(75) Inventor: Dylan J. Tyson, Short Hills, NJ (US)

(73) Assignee: The Prudential Insurance Company of America, Newark, NJ (US)

( * ) Notice: Subject to any disclaimer, the term of this patent is extended or adjusted under 35 U.S.C. 154(b) by 568 days.

(21) Appl. No.: 11/392,780

(22) Filed: Mar. 28, 2006

(65) Prior Publication Data

US 2007/0239582 A1 Oct. 11, 2007

(51) Int. Cl.
*G06Q 40/00* (2006.01)
(52) U.S. Cl. .................................................. 705/36 R
(58) Field of Classification Search .................. 705/35, 705/36 R, 37–38, 40; 715/200, 234, 700; 707/100–104
See application file for complete search history.

(56) References Cited

U.S. PATENT DOCUMENTS

| 5,231,571 | A | 7/1993 | D'Agostino | 364/408 |
|---|---|---|---|---|
| 5,606,496 | A | 2/1997 | D'Agostino | 395/235 |
| 6,871,189 | B2 * | 3/2005 | Brier et al. | 705/35 |
| 6,988,082 | B1 * | 1/2006 | Williams et al. | 705/36 T |
| 6,999,942 | B2 | 2/2006 | Kemper et al. | 705/38 |
| 2002/0052816 | A1 | 5/2002 | Clenaghan et al. | 705/36 |
| 2002/0073006 | A1 * | 6/2002 | Goldman | 705/35 |
| 2002/0173995 | A1 | 11/2002 | Schiminovich | 705/4 |
| 2003/0074307 | A1 * | 4/2003 | Maestle | 705/38 |
| 2004/0073508 | A1 * | 4/2004 | Foster et al. | 705/38 |
| 2004/0098328 | A1 * | 5/2004 | Grant et al. | 705/36 |
| 2004/0236668 | A1 | 11/2004 | Toffey | 705/37 |
| 2004/0267647 | A1 | 12/2004 | Brisbois | 705/35 |
| 2005/0015321 | A1 | 1/2005 | Vindekilde | 705/37 |
| 2005/0044023 | A1 | 2/2005 | Rotman et al. | 705/35 |
| 2005/0187840 | A1 | 8/2005 | Stiff et al. | 705/35 |
| 2005/0187861 | A1 * | 8/2005 | Downey | 705/38 |
| 2005/0216384 | A1 | 9/2005 | Partlow et al. | 705/35 |
| 2005/0251467 | A1 | 11/2005 | Sato | 705/35 |
| 2006/0036465 | A1 * | 2/2006 | O'Donnell | 705/1 |

OTHER PUBLICATIONS

"Proposed Bond Issues", Credit Market, Oct. 26, 1987, p. 1s, vol. 4, No. 43.*
Principles of Corporate Finance, Sixth Edition, Brealey, et al., 27 pages, 2000.
NSSTA—National Structured Settlements Trade Association, in-depth issues, What is a Structured Settlement?, 13 pages, 2000-2001.
Fifth Edition, Investments, Bodie, et al., (2 pages), Chapter Two, Markets and Instruments, (34 pages), Part Four, Fixed-Income Securities, (32 pages), 2002.
PCT Notification of Transmittal of the International Search Report and the Written Opinion of the International Searching Authority, or the Declaration, re PCT/US 07/07871 filed Mar. 28, 2007, mailed Oct. 19, 2007.

* cited by examiner

*Primary Examiner*—Mary Cheung
(74) *Attorney, Agent, or Firm*—Baker Botts L.L.P.

(57) ABSTRACT

According to one embodiment, a customized financial instrument, defined by at least a plurality of parameters received from a purchaser, includes an agreement by an issuer to make a stream of payments. The stream of payments is defined by the plurality of parameters received from the purchaser. The plurality of parameters includes a first date defining the date for the first payment; at least one of a second date defining the date for the last payment, a number of payments, and a duration for the stream of payments; and information defining payment amounts for each of the payments. The customized financial instrument is associated with an identification code, the identification code being issued by a third-party organization and the identification code being unique to the customized financial instrument defined by at least a plurality of parameters received from a purchaser.

4 Claims, 4 Drawing Sheets

| YEAR | EXAMPLE #1 | EXAMPLE #2 | EXAMPLE #3 | EXAMPLE #4 |
|---|---|---|---|---|
| 2007 | $1,000 | $1,000 | $1,000 | $1,131 |
| 2008 | $1,000 | $1,050 | $1,050 | $1,174 |
| 2009 | $1,000 | $1,100 | $1,103 | $1,814 |
| 2010 | $1,000 | $1,150 | $1,158 | $1,803 |
| 2011 | $1,000 | $1,200 | $1,216 | $1,190 |
| 2012 | $1,000 | $1,250 | $1,276 | $1,212 |
| 2013 | $1,000 | $1,300 | $1,340 | $1,235 |
| 2014 | $1,000 | $1,350 | $1,407 | $1,052 |
| 2015 | $1,000 | $1,400 | $1,477 | $1,275 |
| 2016 | $1,000 | $1,450 | $1,551 | $1,169 |
| 2017 | $1,000 | $1,500 | $1,629 | $1,602 |
| 2018 | $1,000 | $1,550 | $1,710 | $1,486 |
| 2019 | $1,000 | $1,600 | $1,796 | $1,203 |
| 2020 | $1,000 | $1,650 | $1,886 | $1,313 |
| 2021 | $1,000 | $1,700 | $1,980 | $1,520 |
| 2022 | $1,000 | $1,750 | $2,079 | $1,543 |
| 2023 | $1,000 | $1,800 | $2,183 | $1,860 |
| 2024 | $1,000 | $1,850 | $2,292 | $1,398 |
| 2025 | $1,000 | $1,900 | $2,407 | $1,597 |
| 2026 | $1,000 | $1,950 | $2,527 | $1,491 |

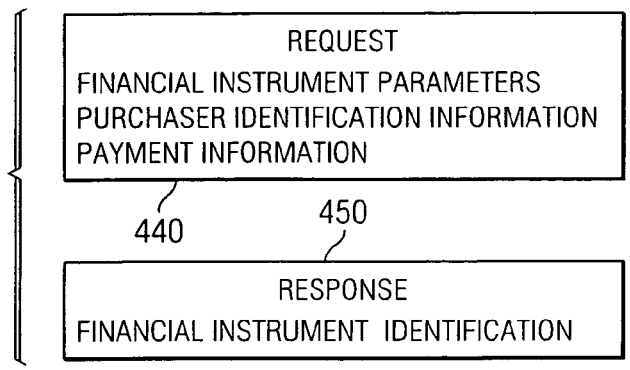

FIG. 5

REQUEST
FINANCIAL INSTRUMENT PARAMETERS
PURCHASER IDENTIFICATION INFORMATION
PAYMENT INFORMATION 440    450

RESPONSE
FINANCIAL INSTRUMENT IDENTIFICATION

580 [Preview]   590 [Further Customize]

My Needs

I would like to receive [510] per [520]

I should receive my first payment on [530]

Once I begin receiving payments, I would like them to grow by [540] per year

I need these these payments to continue until [560]

My Investment

To provide for my future cashflow needs, I am able to/need to invest [570] today

| Payment Date | Payment Amount |
|---|---|
| Jan. 2007 | 610a |
| Feb. 2007 | 610b |
| Mar. 2007 | 610c |
| Apr. 2007 | 610d |
| May 2007 | 610e |

US 7,734,524 B2

CUSTOMIZED FINANCIAL INSTRUMENT PROVIDING A STREAM OF PAYMENTS

TECHNICAL FIELD OF THE INVENTION

This invention relates generally to financial instruments and more particularly to a customized financial instrument providing a stream of payments.

BACKGROUND OF THE INVENTION

There are numerous financial instruments available on the market and people invest in them for a variety of reasons. Some investors are interested in obtaining high rates of return on their investments, while others are willing to forego high rates of return in exchange for a reduced level of financial risk. Some investors are interested in obtaining an income stream for a period of time or possibly for life. When making decisions regarding the selection of a financial instrument, there are multiple tradeoffs. Typically, the lower the risk is, the lower the expected rate of return will be. There are also numerous tax consequences that may be considered when selecting a financial instrument.

For investors interested in obtaining an income stream, there are numerous financial instruments available. For example, investors may invest in certain bonds, certificates of deposits, or annuities. Some of these financial instruments provide fixed income streams, while others provide variable income streams. Bonds, for example, are typically available with fixed income payments. However, there are also variable rate bonds with income payments that change periodically based on market conditions, step-up bonds with income payments that increase at a fixed rate or at pre-determined intervals until maturity, and inflation-indexed bonds with income payments that are adjusted to keep pace with inflation. Similar options are available for annuities, certificates of deposit, and other financial instruments.

For a typical fixed coupon bond, an issuer offers a group of bonds with at least a defined maturity and a defined coupon rate. These bonds are typically underwritten and/or marketed by one or more intermediaries such as a broker or an investment bank. These bonds can then be purchased from the one or more intermediaries. The purchaser typically purchases bonds with a lump sum deposit. Once purchased, the issuer agrees to make periodic payments based on the coupon rate and then to return the bond's par value upon maturity.

SUMMARY OF THE INVENTION

According to one embodiment, a customized financial instrument, defined by at least a plurality of parameters received from a purchaser, includes an agreement by an issuer to make a stream of payments. The stream of payments is defined by the plurality of parameters received from the purchaser. The plurality of parameters includes a first date defining the date for the first payment; at least one of a second date defining the date for the last payment, a number of payments, and a duration for the stream of payments; and information defining payment amounts for each of the payments. The customized financial instrument is associated with an identification code, the identification code being issued by a third-party organization and the identification code being unique to the customized financial instrument defined by at least a plurality of parameters received from a purchaser.

Certain embodiments of the present invention may provide various technical advantages. For example, certain embodiments may allow a customer to purchase a financial instrument that can provide an income stream customized to meet that particular customer's needs and/or desires. The invention may allow a purchaser to create a custom instrument designed for a particular customer, thus allowing the purchaser to specify a particular payment stream to match the particular customer's needs with increased flexibility. As another example, certain embodiments may provide a straightforward, user-friendly interface that allows a purchaser to define a customized financial instrument. Certain embodiments may further provide to the purchaser a transparent disclosure of the provisions of the customized financial instrument. Certain embodiments may provide an interface that allows for bi-directional customization, allowing a purchaser to define a customized financial instrument based on one or more particular needs and/or to define a customized financial instrument based on available funds.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 illustrates example data that may be included in requests to and responses from an example data processing system;

FIGS. 6 and 7 illustrate example forms for use with a graphical user interface to identify parameters for a customized financial instrument and/or to presenting characteristics associated with a customized financial instrument, according to particular embodiments;

DETAILED DESCRIPTION OF THE EXAMPLE EMBODIMENTS

It should be understood at the outset that although example implementations of embodiments of the invention are illustrated below, the present invention may be implemented using any number of techniques, whether currently known or not. The present invention should in no way be limited to the example implementations, drawings, and techniques illustrated below.

Before describing the invention in detail, it may be helpful to consider a general overview of the invention. This general overview should not be considered to be limiting but instead to highlight various aspects of the invention. One problem for investors wishing to purchase instruments such as bonds and certificates of deposit is that the investors are forced to accept the payment amounts, payment timing, and instrument life specified by the issuers of such financial instruments. In addition, payments are normally constant and periodic with these types of instruments, which may not fit the needs of an investor. Various embodiments of the invention may allow an investor to design their own bond, certificate of deposit, or other financial instrument. An issuer may then issue the bond, certificate of deposit, or other financial instrument at a price calculated based upon the characteristics of the financial instrument designated by the investor.

For example, an investor may require higher payments when they retire. The invention allows the investor to specify an exact point in time at which higher payments should be made. A teacher might desire higher payments over the summer versus during the school year. The invention allows the teacher to specify that higher payments will be made on the investment during the summer. Investors may have a number of reasons for desiring payments on an investment to differ in amount, periodicity of payments, etc. Investors may have a number of reasons for desiring an investment to have a particular lifetime. Rather than force an investor to choose from products on the market, the invention may allow an investor to design the financial instrument they would like to buy and then purchase that financial instrument.

Figure 1:
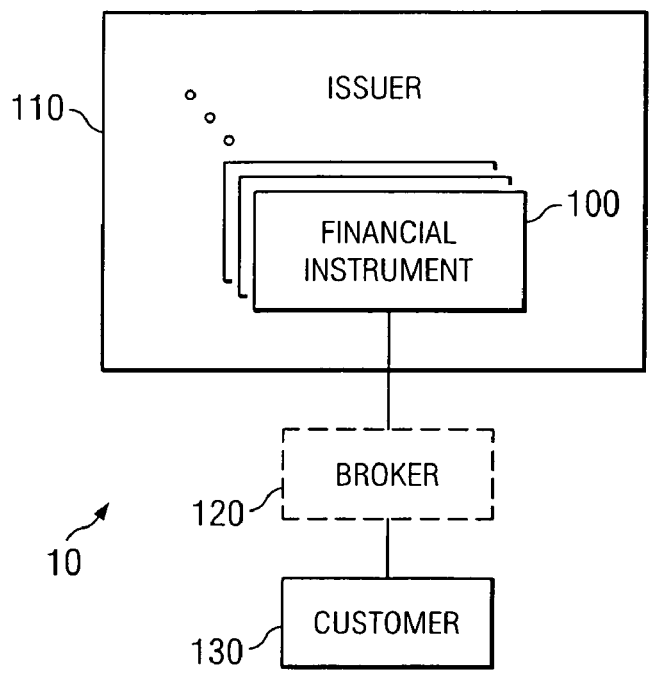
FIG. 1 illustrates a system for providing a customized financial instrument according to a particular embodiment.

FIG. 1 illustrates a system 10 for providing a customized financial instrument 100 according to a particular embodiment of the present invention. System 10 may interact with issuer 110, broker 120, and customer 130 to provide customized financial instrument 100.

Customized financial instrument 100 may represent a contract between issuer 110 and customer 130. Customized financial instrument 100 may include a promise to make a stream of payments to customer 130 as further described below in relation to FIG. 2. In certain embodiments, customer 130 may interact with broker 120, who then interacts with issuer 110 to negotiate customized financial instrument 100. In alternative embodiments, customer 130 may interact directly with issuer 110 to negotiate customized financial instrument 100.

Issuer 110 broadly represents an entity authorized to issue or sell financial instrument 100 as described herein. In certain embodiments, for example, issuer 110 may represent a bank, an insurance company, or other business entity engaged in the sale of one or more financial instruments. Issuer 110 may also represent multiple entities that operate together to issue or sell financial instruments. In embodiments in which issuer 110 includes multiple entities, this may provide beneficial credit diversification.

Broker 120 may represent one or more intermediaries that interact with issuer 110 and customer 130. Broker 120 may or may not be associated with issuer 110. For example, in particular embodiments, broker 120 may interact with customer 130 to determine the needs or desires of customer 130 and to council customer 130 in the purchase of one or more customized financial instruments 100. In this example, broker 120 may then interact with issuer 110 to purchase one or more customized financial instruments 100 on behalf of customer 130.

Customer 130 may broadly refer to an entity that requests or purchases customized financial instrument 100 for themselves or another entity. Customer 130 may also include one or more beneficiaries of customized financial instrument 100 according to particular embodiments. In certain embodiments, customer 130 may be an individual, a couple, a family, or a business entity.

In operation customer 130 identifies certain characteristics for a desired financial instrument. In certain embodiments, these characteristics may be communicated to broker 120 who in turn communicates one or more of these characteristics to issuer 110 in the form of parameters for customized financial instrument 100. In alternative embodiments, customer 130 communicates one or more of these characteristics directly to issuer 110 in the form of parameters for customized financial instrument 100. In particular embodiments, these desired characteristics may define a desired stream of payments to be made by issuer 110 to customer 130, acting either as the owner or beneficiary of customized financial instrument 100. For example, customer 130 may desire a stream of payments that begins on a specified date and extends for a specified duration. These desired characteristics may also include specified amounts for each of the payments within the stream of payments, as further described below in relation to FIG. 2.

Figure 2:
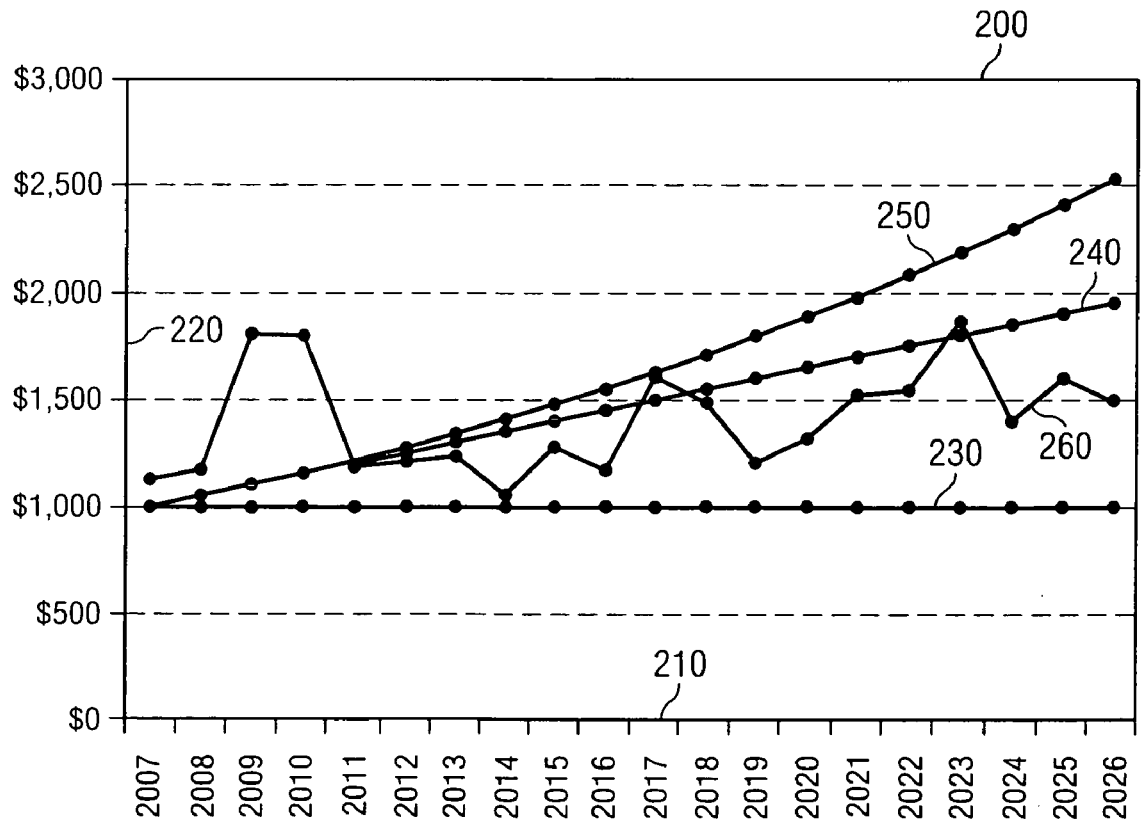
FIG. 2 illustrates a graphical representation of example payment streams that may be provided by customized financial instruments according to particular embodiments.
Figures 3, 4:
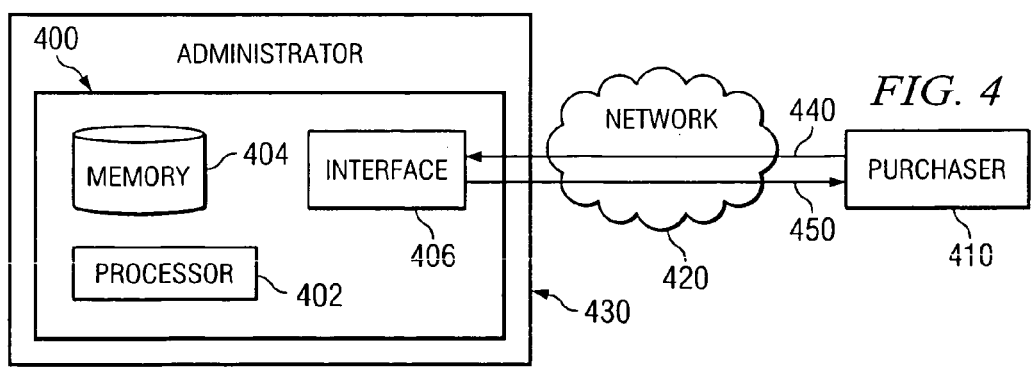
FIG. 3 illustrates a table of example payment streams that may be provided by customized financial instruments according to particular embodiments.
FIG. 4 illustrates an example data processing system for administering and providing one or more customized financial instruments.

FIGS. 2 and 3 illustrate example payment streams that may be provided by customized financial instrument 100. In the examples shown, payments are made on a regular periodic basis with the period being one year. Accordingly, in these examples, payments are made each year in the amounts shown in FIG. 3. These amounts are depicted graphically in FIG. 2 with vertical axes 220 representing the amount of each payment and horizontal axes 210 representing the date of each payment. Although in each of these examples the periodic payments are made at regular intervals with the period between each payment being the same, in alternative embodiments the stream of payments may be made at varying intervals as defined according to the parameters of the stream of payments. Similarly, although the interval period in each of these example embodiments is one year, in alternative embodiments the interval period may be shorter or longer.

In the examples shown, the stream of payments is made over a period of twenty years with the first payment being made in the year 2007 and the last payment being made in the year 2026. These payment dates are shown in column 310 of FIG. 3 and horizontal axes 210 in FIG. 2.

The first example payment stream is identified as example #1 in column 320 of FIG. 3 and is shown in series 230 in FIG. 2. In example #1, each payment in the stream of payments is the same. In this example, issuer 110 would make payments in the amount of $1,000.00 each year from year 2007 to 2026.

The second example payment stream is identified as example #2 in column 330 of FIG. 3 and is shown in series 240 in FIG. 2. In example #2, each payment in the stream of payments increases a fixed amount relative to previous payments such that each payment is $50.00 greater than the previous payment in the stream of payments. In this example, issuer 110 would make payments in an initial amount of $1,000.00 in year 2007, with additional payments incremented by $50.00 a year until the year 2026. Thus as shown in FIG. 2, example #2 represents a linear growth in the stream of payments.

The third example payment stream is identified as example #3 in column 340 of FIG. 3 and is shown in series 250 in FIG. 2. In example #3, each payment in the stream of payments increases at a fixed percentage rate with respect to the previous payments. In this example, issuer 110 would make payments in the amount of $1,000.00 in year 2007 with each subsequent payment increasing by 5% for the next twenty years until year 2026. Thus, as shown in series 250 in FIG. 2, example #3 represents a geometric growth in the stream of payments.

The fourth example payment stream is identified as example #4 in column 350 of FIG. 3 and is shown in series 260 in FIG. 2. In example #4, the payments in the stream of payments are irregular. Example #4 illustrates how customized financial instrument 100 can be used to generate a stream of payments that is uniquely customized to satisfy the needs and/or desires of customer 130. Thus, as shown in series 260 in FIG. 2, each payment may increase or decrease relative to previous payments. Although not shown, in certain embodiments, the stream of payments may be based on an index and/or may include one or more periods during which no payments are made. For example, in a particular embodiment, the stream of payments may include one or more zero-dollar payments followed by a one or more non-zero payments.

In operation, one or more customized financial instruments 100 are purchased from an issuer 110 directly or through one or more intermediaries, such as broker 120. In certain embodiments, customer 130 may place an order for a customized financial instrument 130 by transmitting a request, containing multiple parameters defining the characteristics of the customized financial instrument, to issuer 110. Issuer 110 may then receive and process the request from customer 130. Issuer 110 may then associate the request with an identification code. In certain embodiments, the identification code may be a code issued by a third-party organization. For example, the code may be a nine-digit alphanumeric CUSIP code issued by STANDARD & POOR'S CUSIP SERVICE BUREAU, an organization that exists for the primary purpose of uniquely identifying issuers and issues of financial instruments. Thus, in one embodiment, customized financial instrument 100 may be a bond designed specifically for a particular customer 130.

Issuer 110 may then generate and transmit an offer for the customized financial instrument 100 defined by the parameters received with the request. The generated offer may include, for example, the identification code and one or more characteristics and/or provisions of the customized financial instrument 100. Customer 130 may then receive the generated offer and accept the offer. Upon receiving an acceptance of the offer, issuer 110 may then issue the customized financial instrument 100 defined by the parameters received in the request. In certain embodiments, the process from request to issuance of a customized financial instrument 100 may include more or fewer steps than those described above.

FIGS. 4 and 5 illustrate an example data processing system 400 for administering and providing one or more financial instruments 100 according to particular embodiments. While in certain embodiments, financial instrument 100 may be provided without using a computer, other embodiments may have a computerized option for requesting, issuing and/or selling financial instrument 100.

In the embodiment shown, data processing system 400 represents hardware and/or controlling logic for administering and/or providing financial instrument 100. Data processing system 400 may include processing module 402, memory 404, and interface 406. As shown, data processing system 400 may be included as a system controlled by administrator 430. Although data processing system 400 is shown as a single system, data processing system 400 may be distributed across multiple platforms and housed in multiple locations, some or all of which may or may not be controlled by administrator 430.

Processing module 402 may control the operation and administration of elements within data processing system 400 by processing information received from interface 406 and memory 404. Processing module 402 may include any hardware and/or controlling logic elements operable to control and process information. For example, processing module 402 may be a computer, a programmable logic device, a microcontroller, and/or any other suitable device or devices.

Memory 404 may store, either permanently or temporarily, data and other information for processing by processing module 402 and communication using interface 406. Memory 404 may include any one or combination of volatile or non-volatile local or remote devices suitable for storing information. For example, memory 404 may include random access memory (RAM), read only memory (ROM), magnetic storage devices, optical storage devices, or any other suitable information storage device or combination of these devices. Memory 404 may store, among other things, information associated with one or more requests 440 and responses 450.

Interface 406 communicates information to and/or receives information from devices or systems coupled to data processing system 400. For example, interface 406 may communicate with other elements controlled by administrator 430, network 420, and/or elements coupled to network 420. Thus, interface 406 may include any hardware and/or controlling logic used to communicate information to and from elements coupled to data processing system 400.

Network 420 represents communication equipment, including hardware and any appropriate controlling logic, for interconnecting elements coupled to network 420. Thus, network 420 may represent a local area network (LAN), a metropolitan area network (MAN), a wide area network (WAN), and/or any other appropriate form of network. Furthermore, elements within network 420 may utilize circuit-switched, packet-based, and/or other communication protocols to provide for network communications. The elements within network 420 may be connected together via a plurality of fiber-optic cables, coaxial cables, twisted-pair lines, and/or other physical media for transferring communications signals. The elements within network 420 may also be connected together through wireless transmissions, including infrared transmissions, 802.11 protocol transmissions, laser line-of-sight transmissions, or any other appropriate wireless transmission method.

Administrator 430 may represent an entity or group of entities that coordinate the administration of financial instruments 100. For example, administrator 430 may be issuer 110, an agent for issuer 110, or any other third-party entity that operates as an outsourcing entity for the administration of financial instrument 100. Purchaser 410 may represent one or more customers 130, brokers 120, or agents acting on behalf of one or more customers 130 or brokers 120.

In operation, information associated with requests 440 may be transmitted from purchaser 410 to data processing system 400 through network 420. Data processing system 400 may process requests 440, generate responses 450, and transmit responses 450 to purchaser 410 through network 420. In certain embodiments, data processing system 400 may automatically process requests 440, generate responses 450, and transmit responses 450 to purchaser 410 without any intervening input by administrator 430 or a system user. Alternatively, administrator 430 or a system user may perform one or more offline functions In certain embodiments, information associated with one or more requests 440 may include parameters for customized financial instrument 100, purchaser identification information, and/or payment information. In certain embodiments, response 450 may include an identifier for customized financial instrument 100. For example, the identifier may be an identification code, such as one issued by a third-party organization. Although not shown, in alternative embodiments, response 450 may include one or more disclosure or fulfillment documents. Such disclosure or fulfillment documents may be customized according to the characteristics of customized financial instrument 100. In particular embodiments, response 450 may include one or more fulfillment documents, customized to the particular characteristics of customized financial instrument 100. For example, response 450 may include a customized truth-in-lending statement and/or a customized pricing supplement.

FIGS. 6 and 7 illustrate example forms 500 and 600 for use with a graphical user interface to identify parameters for a customized financial instrument 100 and/or to present characteristics associated with a customized financial instrument 100, according to particular embodiments. Although various embodiments of these forms are described herein, one of skill in the art will recognize that the forms described are not exclusive, that additional or fewer forms may be utilized, and that these forms may be modified to suit particular sales, marketing, and/or customer needs.

In certain embodiments, forms 500 and 600 may be included within or associated with a web based application and/or a stand alone application accessed by a user. In these embodiments, forms 500 and 600 may be associated with software running on one or more processors, the software operable to receive information from and/or transmit information to forms 500 and 600. In certain embodiments, all or a portion of the software associated with one or more of forms 500 and 600 may be distributed across multiple locations. For example, a first portion of the software associated with form 500 may be operating on processor 402 within data processing system 400 and second portion of the software associated with form 500 may be operating on a processor local to the user. In alternative embodiments, all or a portion of the information presented in forms 500 and 600 may be included in one or more printed documents and be transmitted via fax, e-mail, postal service, etc.

In the embodiment shown, form 500 provides form fields and control buttons that may be used to receive information from a user, display information for a user, to transmit received information, and or to initiate one or more actions. Similarly, form 600 provides form fields that may be used to receive information from a user and/or to display information to a user. In the embodiment shown, form 500 includes form fields 510, 520, 530, 540, and 560 associated with parameters for a customized financial instrument 100; form field 570 associated with a deposit amount for a customized financial instrument 100; control button 580 associated with generating a preview of one or more characteristics of a particular financial instrument 100; and control button 590 associated with providing additional parameters for a customized financial instrument 100.

Form field 510 is associated with the amount of a periodic payment for the stream of payments provided by customized financial instrument 100. Form field 520 is associated with the payment interval for the stream of payments provided by customized financial instrument 100. In the embodiment shown, form field 520 utilizes a drop down menu to provide a user with optional intervals to choose from, such as day, week, month, quarter, year, etc. Form field 530 is associated with the initial payment date for the stream of payments provided by customized financial instrument 100. In the embodiment shown, form field 530 utilizes a drop down menu to provide a user with optional initial payment dates. In alternative embodiments, form field 530 may utilize a calendar function to assist a user in identifying an initial payment date.

Form field 540 is associated with a growth rate for the stream of payments provided by customized financial instrument 100. In the embodiment shown, form field 540 utilizes a drop down menu to provide a user with optional growth rates to choose from, such as 0%, 1%, 2%, 3%, 4%, 5%, etc. In alternative embodiments, form field 540 may be associated with alternative payment adjustment methods, such as fixed increase amounts (e.g., $10, $20, $30, etc.), adjustments based on an index (e.g., consumer price index, federal discount rate, LIBOR, S&P 500, Wilshire 5000, etc.), etc.

Form field 560 is associated with a final payment date for the stream of payments provided by customized financial instrument 100. In the embodiment shown, form field 560 utilizes a drop down menu to provide a user with optional final payment dates. In alternative embodiments, form field 560 may utilize a calendar function to assist a user in identifying an initial payment date. In other embodiments, form field 560 may be associated with a duration for the stream of payments, such as a number of payments or a number of weeks, months, or years.

In the embodiment shown, form field 570 is associated with a deposit amount for customized financial instrument 100. In alternative embodiments, form 500 may include multiple form fields associated with a series of deposits that may be made over time for customized financial instrument 100.

In operation, software associated with form 500 may include logic that allows for less than all of the form fields within form 500 to be completed by a user, with the remaining form fields automatically populated with information calculated based on the information provided by the user. For example, a user may provide the information in form field 570 and four out of five of fields 510, 520, 530, 540, and 560, then the fifth form field may be automatically populated with calculated information. In certain embodiments, default information may be presented in one or more of the form fields included within form 500. Similarly, a user may provide the information in form fields 510, 520, 530, 540, and 560, then form field 570 may be automatically populated with calculated information.

In certain embodiments, the logic included within the software associated with forms 500 and 600 may include pricing logic. The pricing logic may calculate a deposit amount based upon one or more well-known pricing techniques. In certain embodiments, the calculated deposit amount is determined using well-known discounted cash flow techniques. As an example, in a particular embodiment, the discount rate may be determined using an "on the run treasury curve" converted to a spot curve, with additional factors included to account for an issuers credit spread. In certain embodiments, linear interpolation may be utilized to generate weekly or monthly calculations from yearly data. Other pricing techniques, including other discounted cash flow techniques, may be used without departing from the scope of the invention.

In certain embodiments, the software associated with forms 500 and 600 may access one or more pricing factors used to determine the discount rate used to calculate the deposit amount. These pricing factors may be accessed from one or more of various storage locations, including data processing system 400, a third-party server, local memory, etc. In certain embodiments, these pricing factors may be fixed during set intervals, such that pricing will remain the same during those set intervals. Alternatively, one or more of these pricing factors may change on a periodic basis, with set periods or with periods determined by market changes. For example, prices may change whenever one or more market indicators fluctuates by a set amount.

In particular embodiments, once the information in the form fields of form 500 have been completed, either by a user or by calculated values, the user may select control button 590 to further customize the parameters for a customized financial instrument 100. In certain embodiments, selection of control button 590 may result in the presentation of form 600 to a user.

Form 600 includes multiple form fields 610. Form fields 610 may be utilized to define a customized stream of payments according to the needs and/or desires of a particular customer 130. In certain embodiments, the information and form fields displayed in form 600 may be determined by the information provided in form 500. For example, if the default date or the date provided by a user in field 530 is January 2007, then the stream of payments presented in form 600 will begin in January 2007, as shown. Similarly, if the default amount or the amount provided by a user is $1000, then the default stream of payments shown in form 600 may be $1000 for each payment. In these embodiments, a user can make adjustments to the stream of payments for each payment that the user would like to be different than the default amount. Although not shown, in certain embodiments, form 600 may include a control button to provide additional options for defining the stream of payments or to select the stream of payments defined according to the then current amounts included within form 600. If a control button is utilized to select the defined stream of payments, selection of the control button may return the user to form 500.

In certain embodiments, one or more form fields included within form 500 may be automatically updated to reflect the changes made to form 600. For example, changes made in form 600 to the stream of payments may trigger a recalculation and update of the deposit amount reflected in form field 570.

In certain embodiments, a user may first define a stream of payments using the features in forms 500 and 600, as described above. Based on this defined stream of payments, a deposit (or group or deposits) may be calculated through the use of pricing logic. The user may then change the amount for the deposit (or group of deposits). Based on the changed deposit amount, calculations may be performed to generate a revised stream of payments that corresponds to the change in the deposit amount. For example, a ten-percent reduction in the deposit amount may result in a ten-percent reduction in each of the payments within the stream of payments. As another example, a reduction in deposit amount may result in a fixed dollar amount being subtracted from each of the payments within a stream of payments. In certain embodiments, the user may be provided with options for the calculation method used to revise the stream of payments.

In certain embodiments, a user may first define a deposit amount using the features in form 500, as described above. The user may then define a stream of payments using the features in forms 500 and 600, as described above, with limiting restrictions on the stream of payments based on the deposit amount. For example, as the user is defining the stream of payments, an increase in one payment may result in a reduction in all or selected other payments, such that the deposit amount remains the same. As another example, a change in the number of payments may result in a change in the amount of the payments, such that the deposit amount remains the same.

In certain embodiments, a user may select control button 580 to review the characteristics of customized financial instrument 100. In certain embodiments, selection of control button 580 may result in the presentation of a cash flow statement that reflects the stream of payments for the customized financial instrument 100.

In operation, forms 500, 600, and associated software may be utilized to assist in the transmission of one or more requests 440. In these embodiments, requests 440 may be transmitted to Although the embodiments of forms 500 and 600 are more particularly suited for use by customer 130 or an agent of customer 130, those of skill in the art could easily adapt one or both of forms 500 and 600 to create substantially similar forms to be used by broker 120 and/or issuer 110.

Although customized financial instrument 100 has been described, for example, with reference to multiple parameters defined by a customer 130, customized financial instrument 100 may be structured in various forms and still fall within the intended scope of these descriptions. For example, customized financial instrument 100 may be structured as an unsecured bond, as a medium-term note, as a certificate of deposit, as a funding agreement, as a guaranteed investment contract, or as any of numerous other financial structures, both known and unknown, so long as they are capable of being customized in the manner described above.

In certain embodiments, customized financial instrument 100 may have survivorship provisions allowing for transfer of ownership upon the death of customer 100. In certain embodiments, multiple customized financial instruments 100 may be combined into a single customized financial instrument 100. For example, a customer 110 may purchase separate customized financial instruments 100 at different times and/or for different durations, then later elect to combine these customized financial instruments 100 to simplify accounting, administration, etc.

In certain embodiments, customized financial instrument 100 may include buyback and/or sellback provisions, allowing issuer 110 to buy back the customized financial instrument 100 and/or allowing customer 130 to sell the customized financial instrument 100 back to issuer 110. For example, in particular embodiments, particular customized financial instruments may be bought back by issuer 110 using then current discounted cash-flow or other appropriate pricing schemes. In various embodiments, the buyback may be initiated by issuer 110 or by customer 130 and may or may not include a premium or discount on the price.

In certain embodiments, customized financial instrument 100 may include provisions allowing customer 100 to transfer ownership of customized financial instrument 100 in a secondary market. In certain embodiments, customized financial instrument 100 may include an option to extend the stream of payments for a an agreed period of time in exchange for an agreed price.

In certain embodiments, one or more customized financial instruments 100 may be structured to allow the one or more customized financial instruments 100 to be included within or associated with a tax protected instrument or account, such as an IRA. In certain embodiments, customized financial instrument 100 may include provisions that allow customized financial instrument 100 to be reformed at a later date to comply with changes in governing laws and/or regulations, such as but not limited to federal tax laws.

Figure 8:
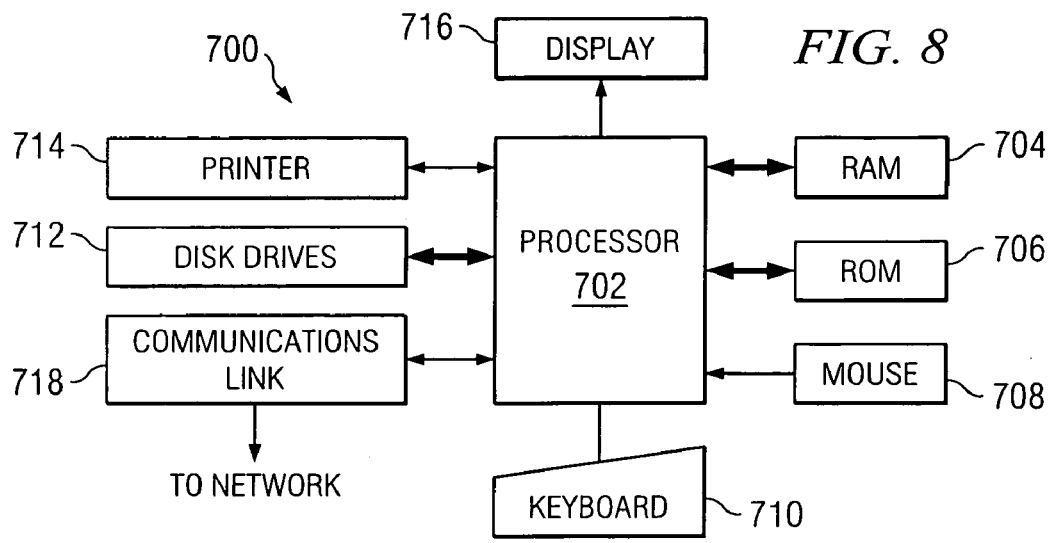
FIG. 8 illustrates an embodiment of a general purpose computer.

FIG. 8 illustrates an embodiment of a general purpose computer 700 that may be used in connection with one or more pieces of software used to implement the invention. General purpose computer 700 may generally be adapted to execute any of the well-known OS2, UNIX, MAC-OS, LINUX, and WINDOWS Operating Systems or other operating systems. The general purpose computer 700 in this embodiment comprises a processor 702, a random access memory (RAM) 704, a read only memory (ROM) 706, a mouse 708, a keyboard 710 and input/output devices such as a printer 714, disk drives 712, a display 716 and a communications link 718. In other embodiments, the general purpose computer 700 may include more, less, or other component parts. Embodiments of the present invention may include programs that may be stored in the RAM 704, the ROM 706 or the disk drives 712 and may be executed by the processor 702. The communications link 718 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 712 may include a variety of types of storage media such as, for example, floppy disk drives, hard disk drives, CD ROM drives, DVD ROM drives, magnetic tape drives, or other suitable storage media.

Although FIG. 8 illustrates one embodiment of a computer that may be used with the invention, the invention may additionally utilize computers other than general purpose computers as well as general purpose computers without conventional operating systems. Additionally, embodiments of the invention may also employ multiple general purpose computers 700 or other computers networked together in a computer network. Most commonly, multiple general purpose computers 700 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 8, the logic comprises computer software executable on the general purpose computer 700. The medium may include the RAM 704, the ROM 706 or the disk drives 712. In other embodiments, the logic may be contained within hardware configurations or a combination of software and hardware configurations. The logic may also be embedded within any other suitable medium without departing from the scope of the invention.

Figure 9:
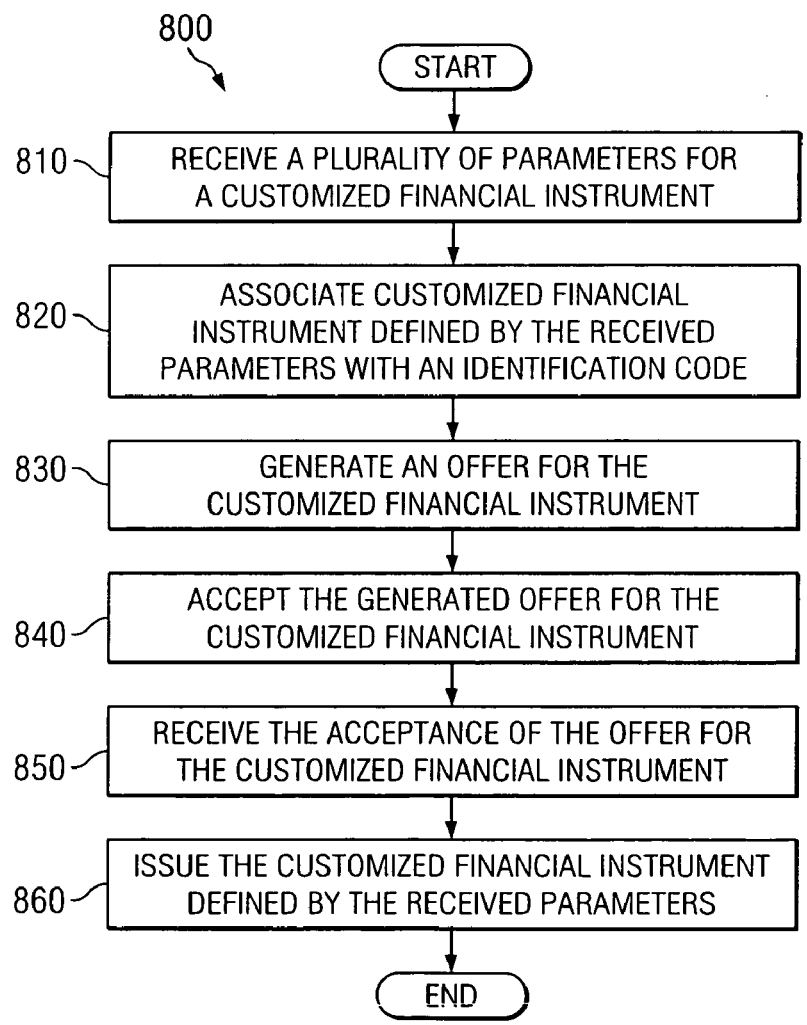
FIG. 9 illustrates an example method for issuing a customized financial instrument, according to a particular embodiment.

FIG. 9 illustrates an example method 800 for issuing a customized financial instrument 100, according to a particular embodiment. At step 810, a plurality of parameters for a customized financial instrument 100 are received. In certain embodiments, the parameters may be received by issuer 110 and the parameters may include a first payment date, a number of payments, and an amount for each payment. In a particular embodiments, the parameters may include an amount for the first payment and a growth factor. At step 820, the customized financial instrument 100 defined by the received parameters is associated with an identification code. At step 830, an offer for the customized financial instrument 100 is generated. At step 840, the offer is accepted. At step 850, the acceptance of the offer is received. At step 860, the customized financial instrument 100 defined by the received parameters is issued. In certain embodiments, the customized financial instrument 100 defined by the received parameters may be structured as a bond or as a certificate of deposit. Thus, method 800 represents a series of steps for issuing a customized financial instrument 100, according to a particular embodiment. Certain of the steps identified in method 800 may take place simultaneously and/or in a different order than shown.

Although the present invention has been described in several embodiments, a plenitude of changes and modifications may be suggested to one skilled in the art, and it is intended that the present invention encompass such changes and modifications as fall within the present appended claims.

To aid the Patent Office, and any readers of any patent issued on this application in interpreting the claims appended hereto, applicants wish to note that they do not intend any of the appended claims to invoke π6 of 35 U.S.C. §112 as this paragraph and section exists on the date of filing hereof unless "means for" or "step for" are used in the particular claim.

What is claimed is:

1. A customized bond request system, comprising software stored on a computer-readable medium and operable to:
receive a plurality of parameters to define a customized bond, the customized bond providing for a stream of payments and transferrable in a secondary market, the plurality of parameters comprising:
a first date defining the date for the first payment of the stream of payments;
at least one of:
a second date defining the date for the last payment of the stream of payments;
a number of payments included in the stream of payments; and
a duration for the stream of payments; and
information defining payment amounts for each of the payments included within the stream of payments;
calculate an amount to be deposited to purchase the customized bond defined by the parameters received, wherein calculating the amount to be deposited to purchase the customized bond comprises a discounted cash flow analysis;
associate the customized bond with an identification code issued by a third-party organization that uniquely identifies issuers and issues of financial instruments;
generate a request for creating the customized bond, the customized bond being defined by the parameters received, identified by the identification code, and transferrable in a secondary market;
generate a cash flow statement for the customized bond;
display the generated cash flow statement;
generate one or more disclosure statements; and
generate one or more customized fulfillment documents for the customized bond, wherein the one or more customized fulfillment documents comprise at least one of a customized truth-in-lending statement and a customized pricing supplement.

2. A system for issuing a customized bond, the system comprising software stored on a computer-readable medium and operable to:
receive a plurality of parameters to define a customized bond providing for a stream of payments and transferrable in a secondary market, the plurality of parameters comprising:
a first date defining the date for the first payment;
at least one of:
a second date defining the date for the last payment of the stream of payments;
a number of payments included in the stream of payments; and
a duration for the stream of payments; and
information defining payment amounts for each of the payments;
calculate an amount to be deposited to purchase the customized bond defined by the parameters received, wherein calculating the amount to be deposited to purchase the customized bond comprises a discounted cash flow analysis;

associate the customized bond defined by the parameters received with an identification code issued by a third-party organization that uniquely identifies issuers and issues of financial instruments;

generate an offer for the customized bond, the customized bond being defined by the parameters received, identified by the identification code, and transferrable in a secondary market;

generate a cash flow statement for the customized bond;

display the generated cash flow statement;

generate one or more disclosure statements;

generate one or more customized fulfillment documents for the customized bond, wherein the one or more customized fulfillment documents comprise at least one of a customized truth-in-lending statement and a customized pricing supplement;

receive an acceptance of the offer for the customized bond; and issue the customized bond defined by the parameters received.

3. A customized bond request system, comprising:

one or more processors;

memory coupled to the one or more processors and configured to store program instructions executable by the one or more processors to:

receive a plurality of parameters to define a customized bond, the customized bond providing for a stream of payments and transferrable in a secondary market, the plurality of parameters comprising:

a first date defining the date for the first payment of the stream of payments;

at least one of:

a second date defining the date for the last payment of the stream of payments;

a number of payments included in the stream of payments; and a duration for the stream of payments; and information defining payment amounts for each of the payments included within the stream of payments;

calculate an amount to be deposited to purchase the customized bond defined by the parameters received, wherein calculating the amount to be deposited to purchase the customized bond comprises a discounted cash flow analysis;

associate the customized bond with an identification code issued by a third-party organization that uniquely identifies issuers and issues of financial instruments;

generate a request for creating the customized bond, the customized bond being defined by the parameters received, identified by the identification code, and transferrable in a secondary market;

generate a cash flow statement for the customized bond;

display the generated cash flow statement;

generate one or more disclosure statements; and generate one or more customized fulfillment documents for the customized bond, wherein the one or more customized fulfillment documents comprise at least one of a customized truth-in-lending statement and a customized pricing supplement.

4. A system for issuing a customized bond, comprising:

one or more processors;

memory coupled to the one or more processors and configured to store program instructions executable by the one or more processors to:

receive a plurality of parameters to define a customized bond providing for a stream of payments and transferrable in a secondary market, the plurality of parameters comprising:

a first date defining the date for the first payment;

at least one of:

a second date defining the date for the last payment of the stream of payments;

a number of payments included in the stream of payments; and a duration for the stream of payments; and information defining payment amounts for each of the payments;

calculate an amount to be deposited to purchase the customized bond defined by the parameters received, wherein calculating the amount to be deposited to purchase the customized bond comprises a discounted cash flow analysis;

associate the customized bond defined by the parameters received with an identification code issued by a third-party organization that uniquely identifies issuers and issues of financial instruments;

generate an offer for the customized bond, the customized bond being defined by the parameters received, identified by the identification code, and transferrable in a secondary market;

generate a cash flow statement for the customized bond;

display the generated cash flow statement;

generate one or more disclosure statements;

generate one or more customized fulfillment documents for the customized bond, wherein the one or more customized fulfillment documents comprise at least one of a customized truth-in-lending statement and a customized pricing supplement;

receive an acceptance of the offer for the customized bond; and issue the customized bond defined by the parameters received.

* * * * *